(12) United States Patent
Hsueh et al.

(10) Patent No.: US 8,004,201 B2
(45) Date of Patent: Aug. 23, 2011

(54) LED CIRCUIT

(75) Inventors: Ching-Wei Hsueh, Sinshih Township, Tainan County (TW); Kuan-Jen Tseng, Sinshih Township, Tainan County (TW)

(73) Assignee: Himax Analogic, Inc., Tainan County (TW)

( * ) Notice: Subject to any disclaimer, the term of this patent is extended or adjusted under 35 U.S.C. 154(b) by 420 days.

(21) Appl. No.: 12/399,088

(22) Filed: Mar. 6, 2009

(65) Prior Publication Data

US 2010/0225247 A1    Sep. 9, 2010

(51) Int. Cl.
*H05B 37/00* (2006.01)
*H05B 39/00* (2006.01)
*H05B 41/00* (2006.01)
*H05B 37/02* (2006.01)
*H05B 39/04* (2006.01)
*H05B 41/36* (2006.01)
*G05F 1/00* (2006.01)

(52) U.S. Cl. ........................... 315/193; 315/297
(58) Field of Classification Search .................. 315/193, 315/297

See application file for complete search history.

(56) References Cited

U.S. PATENT DOCUMENTS

2009/0273290 A1 * 11/2009 Ziegenfuss .................... 315/193

* cited by examiner

*Primary Examiner* — Jacob Y Choi
*Assistant Examiner* — Henry Luong
(74) *Attorney, Agent, or Firm* — Thomas, Kayden, Horstemeyer & Risley, LLP

(57) ABSTRACT

A LED circuit is provided. The LED circuit comprises: an inductor, a group of LEDs, a power MOS and a switching circuit. The switching circuit comprises: an error amplifier generating an error output, a PWM, a RC circuit and a control means. The PWM generates a switching signal according to the error output to control the power MOS to charge or discharge the group of LEDs; the RC circuit comprises at least one first capacitor each comprising a switch, at least one second capacitors; and a resistive means connected in series between the first and the second capacitors and the error output. The control means generates a control signal according to the dimming signal to turn on the switches to activate the first capacitors during the active period of the dimming signal and turn off the switches to deactivate the first capacitors during the inactive period of the dimming signal.

6 Claims, 2 Drawing Sheets

LED CIRCUIT

BACKGROUND

1. Field of Invention

The present invention relates to a LED circuit. More particularly, the present invention relates to a LED circuit having fast compensation mechanism.

2. Description of Related Art

LEDs are estimated to be four times as efficient as conventional incandescent lights. They are also claimed to be more economically sound than compact fluorescent bulbs that contain harmful mercury and are supposed to last a lot longer than the conventional lighting. Thus, LEDs may become the mainstream of the lighting technology.

The switching circuit in the LED circuit is to perform charge and discharge on the LEDs. The PWM in the switching circuit requires a RC circuit with large RC constant to perform compensation. However, the conventional design of the RC circuit with large RC constant can provide large amount of charging current but result in low discharging activity. Thus the switching activity of the LED circuit losses the linearity due to the RC circuit.

Accordingly, what is needed is a LED circuit with a new design of the switching circuit to provide the compensation mechanism without losing of the linearity.

SUMMARY

A LED circuit is provided. The LED circuit comprises: an inductor, a group of LEDs, a power MOS and a switching circuit. The inductor is connected to a voltage supply and a first node; the group of LEDs is connected to the first node and a ground potential; the power MOS is connected to the first node and the ground potential; the switching circuit comprises: an error amplifier, a pulse width modulator, a RC circuit and a control means. The error amplifier is to generate an error output according to a dimming voltage having an active period and an inactive period; the pulse width modulator is to generate a switching signal according to the error output to control the gate of the power MOS to charge or discharge the group of LEDs; the RC circuit comprises at least one first capacitor each comprising a switch, at least one second capacitors, wherein the first and the second capacitors are connected in parallel; and a resistive means connected in series between the plurality of first and the second capacitors and the error output; and the control means is to generate a control signal according to the dimming signal, wherein the control signal turns on the switches to activate the first capacitors when the dimming signal is in the active period to make the RC circuit perform charging and turns off the switches to deactivate the first capacitors when the dimming signal is in the inactive period to make the RC circuit perform discharging.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
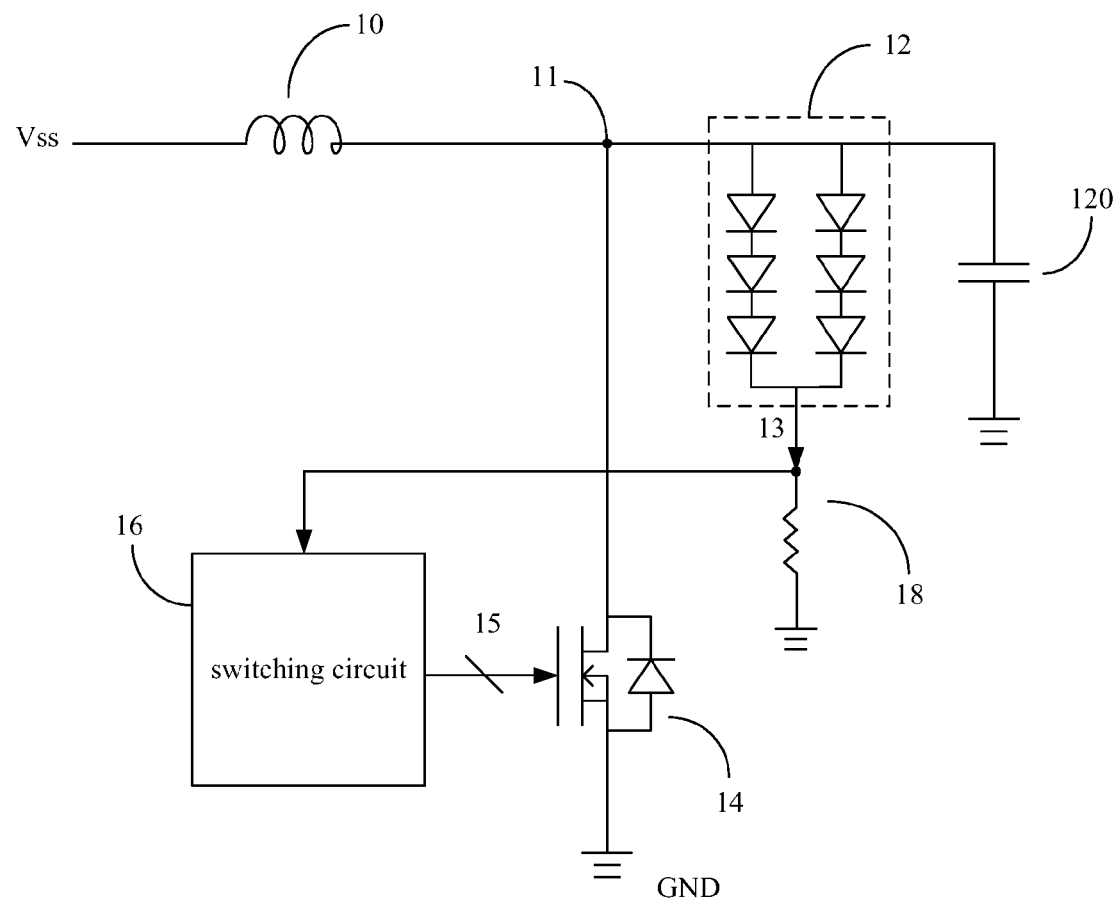
FIG. 1 is a diagram depicting a LED circuit of an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1. FIG. 1 is a diagram depicting a LED circuit 1 of an embodiment of the present invention. The LED circuit 1 comprises an inductor 10, a group of LEDs 12, a power MOS 14, a switching circuit 16 and a load 18. The inductor 10 is connected to a voltage supply Vss and a first node 11. One end of the group of LEDs 12 is connected to the first node 11, while the other end is connected to the load 18. The load 18 receives an output voltage 13 from the group of LEDs 12 and further connected to a ground potential GND. The power MOS 14 is connected to the first node 11 and the ground potential GND. The switching circuit 16 generates a switching signal 15 to control the gate of the power MOS 14. The group of LEDs 12 further comprises a capacitor 120, when the switching signal 15 turns on the power MOS 14, the power MOS 14 starts to charge the capacitor 120 to further turn on the group of LEDs 12. When the switching signal 15 turns off the power MOS 14, the capacitor 120 starts to discharge to further turn off the group of LEDs 12.

Figure 2:
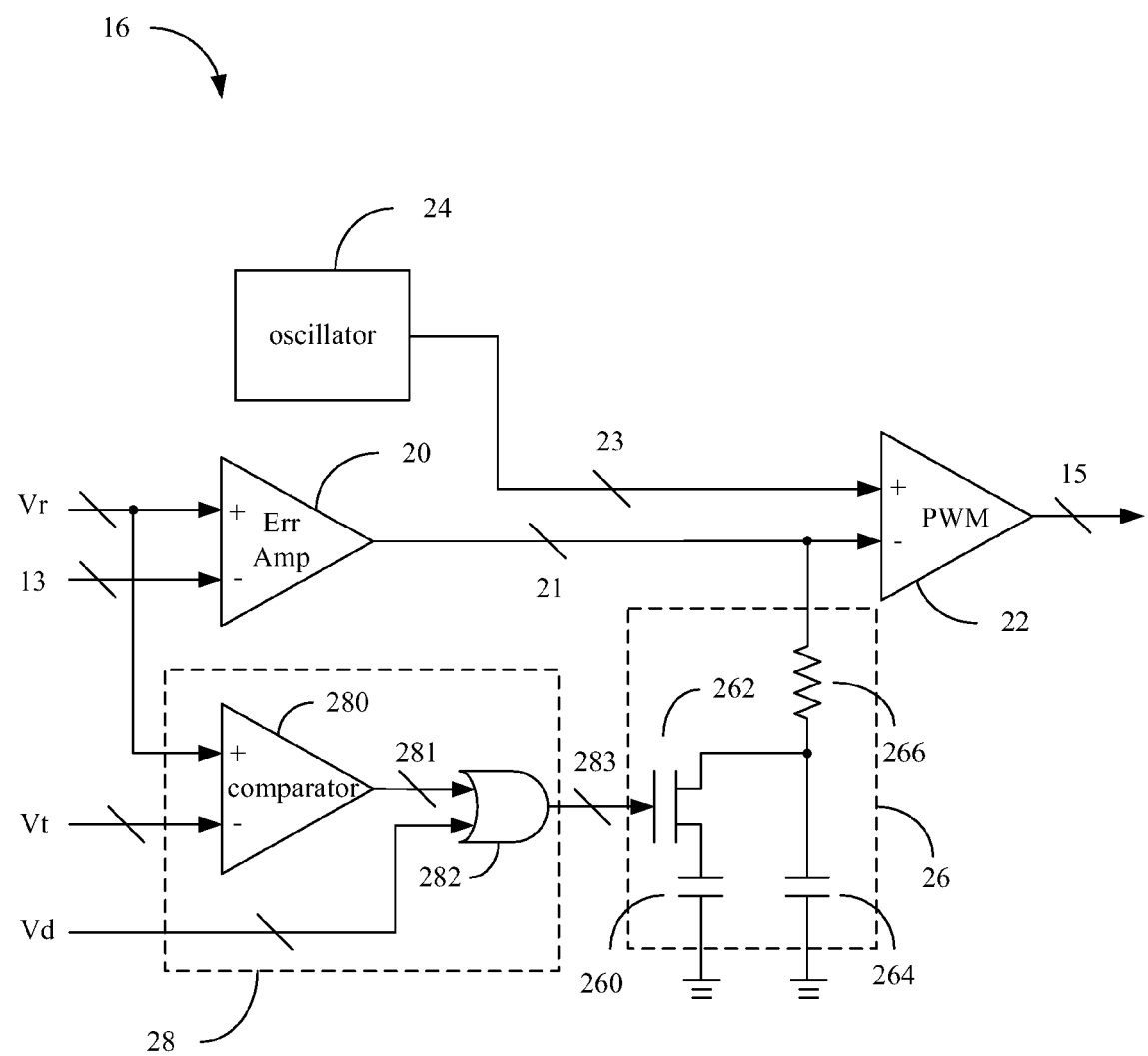
FIG. 2 is a diagram of the switching circuit of an embodiment of the present invention.

Please refer to FIG. 2. FIG. 2 is a diagram of the switching circuit 16 of an embodiment of the present invention. The switching circuit 16 comprises: an error amplifier 20, a pulse width modulator 22, an oscillator 24, a RC circuit 26 and a control means 28. The error amplifier 20 comprises a non-inverting input to receive a reference voltage Vr and an inverting input to receive the output voltage 13 of the group of LEDs 12. The reference voltage Vr is generated according to a dimming voltage Vd. The dimming voltage Vd has an active period and an inactive period, wherein the active and inactive period determine the operation of the group of LEDs. An error output 21 is generated substantially according to the reference voltage Vr and the output voltage 13. The oscillator 24 is to generate an oscillating signal 23. The pulse width modulator 22 is to generate the switching signal 15 according to the error output 21 and the oscillating signal 23 to control the gate of the power MOS 14 to further control the charging and discharging activities of the group of LEDs 12, as described previously. The RC circuit 26 comprises a first capacitor 260 comprising a switch 262, a second capacitor 264 and a resistive means 266. The first and the second capacitors 260 and 264 are connected in parallel. The resistive means 266 is connected in series between the first and the second capacitors 260 and 264 and the error output 21. It's noticed that the number of the first and the second capacitors 260 and 264 can be different in other embodiments. The pulse width modulator 22 requires the RC circuit 26 with large RC constant to perform compensation. However, the conventional design of the RC circuit 26 with large RC constant can provide large amount of charging current but will result in low discharging activity. Thus the switching activity of the LED circuit losses the linearity due to the RC circuit. The control means 28 and the RC circuit 26 in the present invention can provide a large amount of charging current and provide a fast discharging mechanism as well. In the present embodiment, the control means 28 comprises a comparator 280 and an AND gate 282. The comparator 280 is to generate a compare result 281 according to the reference voltage Vr and a threshold voltage Vt. When the dimming signal Vd is in the active period, which is a high state, the reference voltage Vr generated according to the dimming signal Vd is higher than the threshold voltage Vt to make the compare result 281 a high voltage. When the dimming signal Vd is in the inactive period, which is a low state, the reference voltage Vr is lower than the threshold voltage Vt to make the compare result 281 a low voltage. However, the compare result 281 can't distinguish the rising edge and the falling edge condition of the dimming signal Vd. In other words, the compare result 281 can't promise that the reference voltage Vr is becoming larger than the threshold voltage Vt or becoming lower than the threshold voltage Vt at the edge condition. Thus, the AND gate is to receive the compare result 281 and the dimming signal Vd to determine the edge condition to generate a control signal 283.

As a result, the control signal 283 turns on the switch 262 to activate the first capacitor 260 when the dimming signal Vd is in the active period to make the RC circuit 26 perform charging with a larger RC constant to compensate the pulse width modulator 22. Otherwise, the control signal 283 turns off the switch 262 to deactivate the first capacitor 260 when the dimming signal Vd is in the inactive period to make the RC circuit 26 perform discharging with lower RC constant. Thus, with the control signal, the RC circuit 26 in the present invention can provide a large amount of charging current and provide a fast discharging mechanism at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A LED circuit comprising:
    an inductor connected to a voltage supply and a first node;
    a group of LEDs connected to the first node and a ground potential;
    a power MOS connected to the first node and the ground potential;
    a switching circuit comprising:
        an error amplifier generating an error output according to a dimming voltage having an active period and an inactive period;
        a pulse width modulator (PWM) to generate a switching signal according to the error output to control the gate of the power MOS to charge or discharge the group of LEDs;
        a RC circuit comprising:
            at least one first capacitor each comprising a switch;
            at least one second capacitors, wherein the first and the second capacitors are connected in parallel; and
            a resistive means connected in series between the first and the second capacitors and the error output; and
        a control means to generate a control signal according to the dimming signal, wherein the control signal turns on the switches to activate the first capacitor when the dimming signal is in the active period to make the RC circuit perform charging and turns off the switches to deactivate the first capacitor when the dimming signal is in the inactive period to make the RC circuit perform discharging.

2. The LED circuit of claim 1, wherein the group of LEDs further comprises a capacitor, the switching signal controls the gate of the power MOS to substantially charge or discharge the capacitor to turn on or turn off the group of LEDs.

3. The LED circuit of claim 1, further comprising a load connected between the group of LEDs and the ground potential to receive an output voltage of the group of LEDs.

4. The LED circuit of claim 3, wherein the error amplifier comprises a non-inverting input to receive a reference voltage and an inverting input to receive the output voltage of the group of LEDs, wherein the reference voltage is generated according to the dimming voltage, the error output is generated substantially according to the reference voltage and the output voltage.

5. The LED circuit of claim 4, wherein the control means comprises;
    a comparator to generate a compare result according to the reference voltage and a threshold voltage, when the dimming signal is in the active period, the reference voltage is higher than the threshold voltage to make the compare result a high voltage, when the dimming signal is in the inactive period, the reference voltage is lower than the threshold voltage to make the compare result a low voltage; and
    an AND gate to receive the compare result and the dimming signal to generate the control signal.

6. The LED circuit of claim 1, wherein the switching circuit further comprises an oscillator to generate an oscillating signal, the pulse width modulator substantially generates the switching signal according to the error output and the oscillating signal.

* * * * *